Aug. 12, 1952 — J. C. BOLTINGHOUSE — 2,606,447
ANTIFRICTION BEARING
Filed Nov. 1, 1949 — 2 SHEETS—SHEET 1
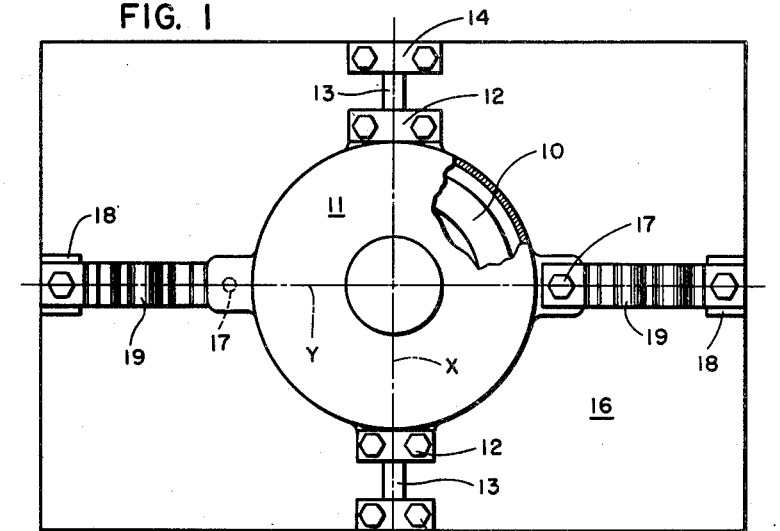
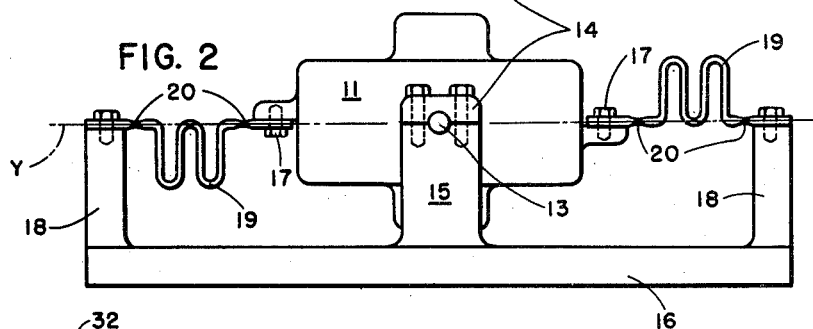
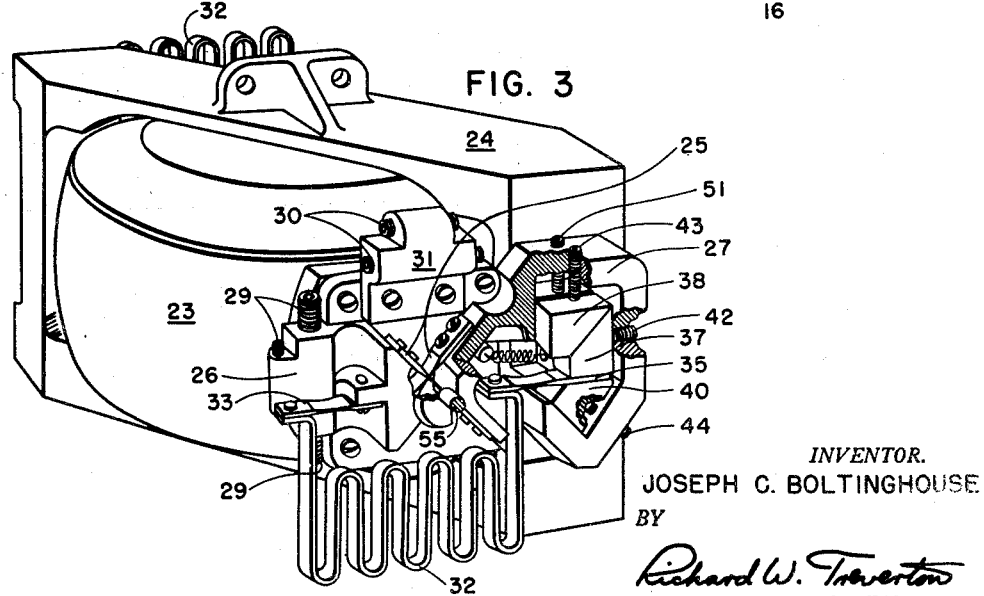
INVENTOR.
JOSEPH C. BOLTINGHOUSE
BY
Richard W. Treverton
ATTORNEY Aug. 12, 1952     J. C. BOLTINGHOUSE     2,606,447
ANTIFRICTION BEARING
Filed Nov. 1, 1949     2 SHEETS—SHEET 2
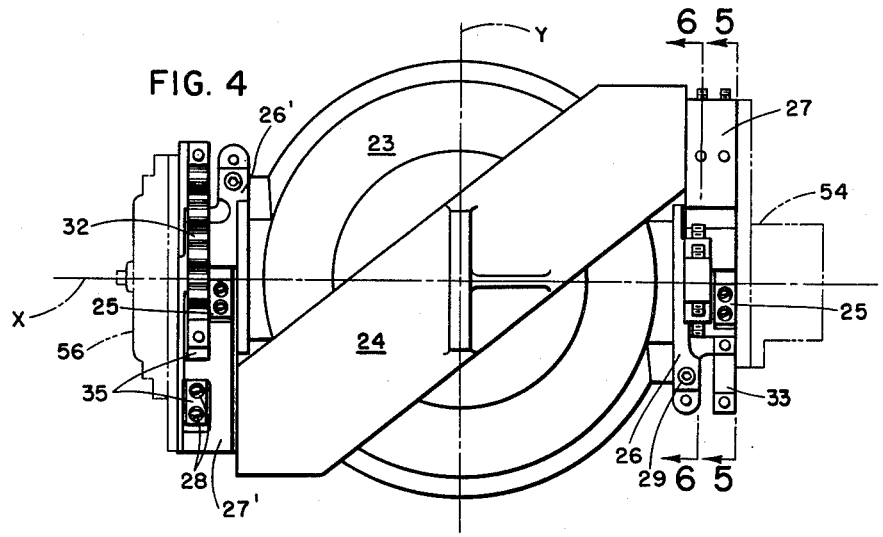
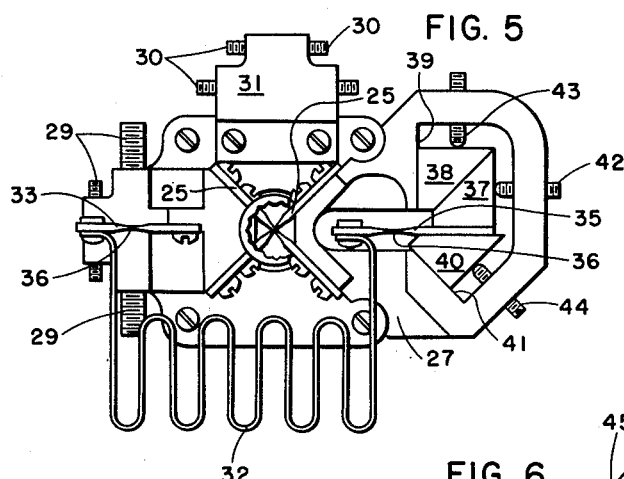
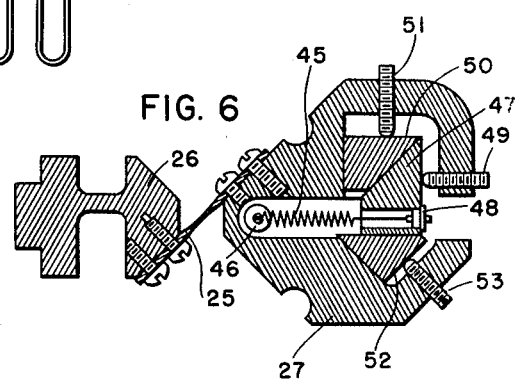
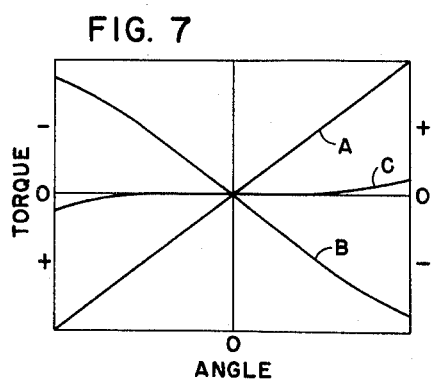
INVENTOR.
JOSEPH C. BOLTINGHOUSE
BY
Richard W. Treverton
ATTORNEY.

Patented Aug. 12, 1952

2,606,447

UNITED STATES PATENT OFFICE 2,606,447

ANTIFRICTION BEARING

Joseph C. Boltinghouse, Reynoldsburg, Ohio, assignor to Curtiss-Wright Corporation, a corporation of Delaware Application November 1, 1949, Serial No. 124,859

5 Claims. (Cl. 74—5)

The present invention relates to an anti-friction bearing for supporting a gyroscope and for similar purposes where motion through only small angles is involved.

A gyro, for example, is sometimes mounted on a supporting base that is provided with means causing it to closely follow the angular movement of the gyro, and accordingly the latter may be expected to move through only very small angles relative to the base, on the order of five degrees or less to either side of a neutral position. The main objective of this invention is to provide a supporting bearing which imposes little or no restraint to such small angular movements, which is of simple and durable mechanical construction, and which is self-contained, not requiring auxiliary equipment such as do gas bearings, for example.

According to the invention, the gyro or other device is supported by spring means which firmly establish its location relative to its supporting base, but which are adapted to flex to provide for limited movement relative to such base about one axis. When so flexed, the spring means of course exert a restoring force moment which tends to return the supported device to a neutral position. The present invention provides means which exert an anti-restoring moment that substantially balances and cancels out the restoring moment, so that restraint by the supporting spring means about the flexure axis is obviated. Accordingly, an almost friction-free bearing support results inasmuch as very little energy is absorbed by internal friction in good spring materials, particularly when the rate of flexure is slow.

The means for exerting the anti-restoring moment conveniently take the form of one or more flexed springs arranged for toggle or over-center action relative to the axis of bearing support, so that they exert no torque on the supported device in its neutral position but exert an increasing anti-restoring moment as it moves from neutral position, to thereby balance the restoring moment of the supporting spring means which ordinarily will increase linearly with the angle of displacement from neutral.

The invention contemplates the provision of adjusting means for bringing the line of force of the anti-restoring force means into accurate intersection with the axis of bearing support provided by the supporting spring means when the latter are in the neutral position, and also contemplates means for adjusting the value of the anti-restoring force so that it may be made as nearly as possible equal to the restoring force which it is intended to balance.

In addition to the main advantages indicated hereinbefore, the invention also provides a means for transmitting power in the form of electricity or fluid under pressure to and from the gyro motor housing or other supported device without imposing any additional frictional restraint to angular movements about the support axis. This is important because it is usually desired to operate the gyro motor from an external power source, and often there are other power operated or energy emitting devices mounted on the rotor housing and which must be connected by power transmission means to external apparatus. These devices may take the form, for example, of a torquing device for applying a moment to the gyro to cause it to precess for purposes of correction or control, or of a pick-off device for signalling to a control system the angle through which the gyro has moved relative to its support. The springs of the suspension system may be easily adapted for use as energy conductors leading to such devices. In the case of electricity, one or more of the springs may be insulated from the connected structure and serve to carry electricity between a conductor on the rotor casing and a conductor on the support; while in the case of compressed air or other fluid under pressure one or more of the springs may be made of tubular form and arranged to serve as part of a fluid passage extending between the gyro casing and its support.

The foregoing and other objects and advantages will become apparent from the following detailed description made in conjunction with the drawings, wherein:

Figs. 1 and 2 are respectively plan and side elevational views of one embodiment of the invention;

Figs. 3 and 4 are respectively a perspective view and a plan view of another embodiment of the invention;

Figs. 5 and 6 are sectional views taken respectively along lines 5—5 and 6—6 of Fig. 4; and, Fig. 7 is a graph showing the suspension spring torques upon angular displacement of the supported device from neutral position.

In the form of the invention shown in Figs. 1 and 2 the rotor 10 of a gyroscope is mounted within a housing 11 for spinning motion about an upright axis, the rotor being driven by a suitable motor which also is contained within the housing. The housing is clamped by suitable means 12 to the inner ends of torsion spring rods 13 whose outer ends are clamped by means designated 14 to uprights 15 extended from a supporting base 16. The rods 13 extend along one axis of precession of the gyroscope indicated as X, which is perpendicular to the axis of spin of the rotor 10. The rods are designed to provide substantially unyielding support for the gyroscope relative to base 16 except for movement through small angles about the X-axis which movement is permitted by the torsional flexure of the rods. The entire assembly supported by the rods, including the rotor and housing, is preferably statically balanced about the X-axis so that in the absence of displacement of the gyroscope about that axis, the rods will be in their neutral or unstrained condition. It will be understood that the base 16 may be of various forms and may, if desired, itself be mounted on another support, not shown, by pivot means which will allow the gyro to move about one or more other axes, such as the Y-axis extending in the direction indicated by the line Y in Figs. 1 and 2.

Compression springs 19 are attached at their ends to the rotor housing, as shown at 17, and to uprights 18 extended from base 16. Each of these springs has an attenuated portion 20 near each of its ends, to provide a flexure point about which the intermediate portion of the spring may pivot freely. At the same time, the springs may have the desired high degree of stiffness in compression and be heavy enough at their end points of attachment to prevent creep. The springs are so arranged that when the gyro is in its neutral position, wherein the rods 13 are torsionally neutral, all of the flexure points 20 are disposed along the single line Y (as viewed in Fig. 2) which passes through the intersection of the X-axis and the rotor spin axis, and which preferably is perpendicular to the X-axis when only one pair of springs 19 is employed. It will be seen that in the neutral position illustrated, the two springs 19, which are compressed along the Y axis, directly oppose each other and that they apply no torque to the gyro. However, as the gyro moves about its X-axis in either direction from neutral, the lines of force of the springs 19 shift in opposite directions from intersection with the X-axis so that the springs now exert a moment in the direction of such gyro movement. Thus these springs constitute a means for applying an anti-restoring moment as distinguished from the restoring moment of the torsion rods 13 which acts to return the gyroscope to its neutral position.

For small angular displacements of the gyro such as are contemplated by the present invention, which may be on the order of less than five degrees and preferably are less than one degree, this anti-restoring moment increases nearly linearly with the angle of displacement from neutral. This is because the moment arm, represented by the distance between the X-axis and the line of force of the spring, increases almost in direct linear proportion with the displacement angle for small angles of displacement, and because for such small angles the length of this spring, and hence the reciprocal of its force, increases only very slightly with the displacement.

The restoring moment acting on the gyro, including that exerted by the torsion rods and also that exerted by the springs 19 in bending about flexure points 20, varies in linear proportion with the angle of displacement of the gyroscope from neutral position. The springs 19 are so proportioned that the anti-restoring moment they provide equals and balances the total restoring moment as nearly as is possible. In Fig. 7, the line A represents the total restoring moment exerted by rods 13 and by the springs 19 in bending about flexure points 20, curve B represents the anti-restoring force exerted by springs 19 acting in compression and curve C represents the net moment exerted by the spring system on the gyro. The graph exaggerates the non-linearity of curve B which is caused by the slight elongation of springs 19 as the gyro rotates, and similarly exaggerates the deviation of line C from zero, but it serves to illustrate the almost complete absence of restraint imposed by the spring system for small angles of displacement of the gyroscope.

In the event the motor for spinning the gyro is operated by compressed air or other fluid under pressure, the rods 13 may be made tubular in form, and thereby may serve respectively as part of an inlet conduit, to conduct fluid from a suitable external pressure source to the motor within housing 11, and as part of an outlet conduit for carrying spent fluid away from the motor. Or, if an electric motor is employed, either the spring rods 13 or the springs 19, or both, may be insulated from the base 16 and from the housing 11, and may serve as electrical conductors to carry electric current for operating the motor and/or other electrical devices mounted on the housing.

In the embodiment of the invention shown in Figs. 3 to 6, inclusive, the gyroscope rotor and a suitable electric motor for spinning it about an upright axis are mounted within a housing 23. The latter is supported within a rectangularly shaped base frame 24 by a pair of spring systems, one at each end of the frame. These two spring systems are of substantially similar but inverted arrangement in order to provide, insofar as possible, balance about the spin axis and both precession axes of the gyro. For the purpose of the immediately following detailed description, the spring system at the right end of the frame in Fig. 4 has been chosen.

The pivotal support, corresponding in function to one of rods 13 in the form of the invention shown in Figs. 1 and 2, is provided by a pair of mutually perpendicular thin spring strips or leaves 25 each attached at one end to a member 26 that is rigidly secured to the gyro casing 23, and attached at the other end to an extension 27 of the frame 24. The spring strips have attenuated portions at their line of intersection (as viewed in Fig. 5) which defines the center of the X-axis bearing. Due to column action, the strips firmly establish the location of the gyro relative to the frame but they restrain it rotationally only to the extent of their combined flexural stiffness.

Adjustable weights in the form of vertical screws 29 are threaded into a member 26 and similar adjustable weights comprising horizontal screws 30 are threaded into a member 31 that is rigidly attached to member 26. By screw adjustment of these weights, the assembly comprising the gyro and its housing may be statically balanced about the X-axis.

For exerting the anti-restoring moment desired to balance the restoring moment exerted by the spring strips 25 when flexed, a tension spring 32 is provided. One end of this spring is anchored to a leaf spring 33 secured to the member 26, while its opposite end is anchored to a leaf spring 35 that is attached to extension 27 of frame 24 through the agency of adjustable clamping means. The leaf springs 33 and 35 have attenuated portions 36 which provide flexure points about which tension spring 32 may pivot freely.

The clamping means shown associated with leaf spring 35 in Figs. 3 and 5 provide for adjustment of the tension of spring 32 and also for the vertical adjustment of leaf 35 to the end that the effective line of force of the tension spring, between flexure points 36, may pass accurately through the X-axis in the neutral position of the gyro. These clamping means include a block 37 secured to leaf spring 35 and having a bevel face engaging a complimentary bevel face of a block 38 which is adapted for slideable adjustment along vertical face 39 of extension 27, and further includes a block 40 adapted to wedge between the under surface of leaf 35 and an inclined face 41 of extension 27. The blocks 37, 38 and 40 are respectively adjustable by screws 42, 43 and 44 which are threaded into the extension 27. It will be seen that by conjoint adjustment of screws 42 and 43, the block 37 may be caused to move horizontally, to vary the tension of spring 32, without affecting the vertical adjustment of leaf 35; and that by conjoint adjustment of screws 43 and 44, the leaf 35 may be moved vertically to adjust the effective line of action of spring 32 without disturbing the horizontal adjustment of block 37.

The effect of the foregoing spring adjustments may be modified by finer adjustment means, best shown in Fig. 6, which include a light coil spring 45. This spring has its inner end anchored to a cylindrical insulator 46 mounted upon member 26 of the rotor housing and its outer end anchored to a bevel block 47 by an insulator 48. Block 47 is adjustable horizontally to either compress or tension the spring 45, by adjustment of a horizontal screw 49 and conjoint adjustment of associated bevel block 50 by vertical screw 51. The line of force of spring 45 is adjustable by vertical adjustment of block 50 and conjoint adjustment of a wedge block 52, which engages the horizontal bottom surface of block 47, by means of inclined adjustment screw 53. It will be seen that when in compression, the spring 45 exerts an anti-restoring moment and when tensioned a restoring moment, so that it may be used as a fine adjustment superimposed upon the coarser adjustment of the spring 32 both as to amount of spring force and as to line of spring force.

It has been determined that for the purposes of the illustrated device, a sufficient range of spring adjustment can be obtained by adjusting means at only one end of the gyro. Hence such means have not been included in the spring mounting shown at the left end of the gyro, as the parts appear in Fig. 4, this mounting omitting entirely the coil spring 45 and the adjusting blocks therefor as well as the adjusting blocks for the left tension spring 32. The leaf spring 35 which connects this spring 32 to frame 24 is rigidly secured by screws 28 to the left frame extension, designated 27'.

Assuming that the balance weights 29 and 30 and the springs 32 and 45 have been properly adjusted, and that the housing 23 of the spinning gyro is in its neutral position with respect to the base 24, the X-axis as defined by the line of intersection of spring strips 25 will intersect the center of gravity of the housing 23 and its contents, and will also intersect the effective line of action of the two springs 32 as modified by the adjustment of coil spring 45. Moreover, the tension exerted by springs 32 (as modified by spring 45) is such that upon slight angular displacements of the housing from neutral about the X-axis, the anti-restoring moment exerted by these springs, as represented by curve B in Fig. 7, will substantially balance the restoring moment exerted by flexure of spring strips 25, represented by line A in Fig. 7. The restoring moments vary linearly with the angle of displacement since the supports 25 are simple cantilever springs.

While the springs 25, 32, 33 and 35 of course may be made of any suitable spring material, it is preferred to use for this purpose heat treated beryllium copper because it is relatively free of corrosion, the modulus in bending is low relative to that of steels, the proportional limit is high and the hysteresis loop is narrow. However, as it is preferred to make the gyro housing and frame parts of a light metal, such as aluminum, this gives rise to unequal thermal expansion which may shift the housing relative to the frame. However, with the illustrated arrangement of the springs 25 with the frame and gyro housing, the relative movement of the last-mentioned parts will be about the spinning axis of the gyro and hence no precessional effects will result.

The gyro and mounting therefor illustrated in Figs. 3 to 6, inclusive, was designed for installation upon a platform (not shown) which in turn may be mounted for angular movement upon a suitable vehicle. In order to sense and measure the value of torques applied to the platform about the Y-axis, which result in precession of the gyro about the X-axis, the stator of a pick-off unit indicated in Fig. 4 at 54 may be mounted upon the extension 27 on one end of the frame, and a shaft 55 may be extended (as shown in Fig. 3) from member 26 of the housing 23 to the rotor of the pick-off unit. In order to utilize precession of the gyro for urging movement of the frame 24 about the Y-axis (on bearing means not shown), a torquing device 56 may be provided. The stator of this device can be mounted on the extension 27' from the adjacent end of the frame, and the rotor of the device may be connected by a shaft, similar to 55, connected to the member 26' at the adjacent end of the rotor housing.

This invention is not concerned with the operation of the various systems in which the gyro may be used, or with the units, indicated at 54 and 56, which may or may not be associated with it, depending upon the particular requirements at hand. However, the spring mounting which constitutes the present invention has the further advantage, if such units are provided, that the springs may be used as conductors in electrical circuits for these devices as well as for the motor which spins the gyro, thereby relieving the gyro of restraint due to electrical conductors extending between the frame and rotor housing. In order to avoid use of insulators in the mountings of the support leaf springs 25 and of the balancing springs 32, it is preferred to employ the coil spring 45 as an insulated conductor; and it is for this reason that the insulators 46 and 48 are provided. The spring 45 may, as one example, be used as a conductor in the electrical lead to the motor which spins the gyro rotor while the housing 23, frame 24, and springs 25, 32 serve as a return or ground connection.

It will be understood that the invention is susceptible of numerous different physical embodiments which will readily occur to persons skilled in the arts and to which the invention relates and accordingly that the foregoing description is made by way of illustration of the principles involved and not by way of limitation, there being no intention to limit the scope of the invention otherwise than by the definitions thereof in the appended claims.

I claim:

1. A mounting for a gyro comprising a torsion rod supporting the gyro and providing by torsional flexure thereof for movement of the gyro about one axis thereof, said rod upon such flexure thereof exerting a restoring moment upon the gyro, and force applying means arranged to exert an anti-restoring moment increasing in value from zero as the rod is flexed from its neutral condition, the value of the anti-restoring moment being substantially equal to the restoring moment.

2. In combination with a gyro having a housing and a supporting element, a pair of torsion rods extending along one axis of the gyro and connecting opposite sides of said housing to said supporting element, said rods by torsional flexure enabling movement of the gyro about said axis and exerting a restoring moment urging the gyro toward a neutral position relative to said element, and a pair of compression springs for exerting an anti-restoring moment upon the gyro, each of said springs having its opposite end portions articulated respectively to said element and to said housing, with the line of spring action intersecting said axis in said neutral position of said gyro and departing from said axis as the gyro moves about the latter relative to said element, said springs being so compressed that the anti-restoring moment which they exert upon the gyro substantially balances said restoring moment.

3. In combination with a gyro having a housing and a supporting element therefor, first spring means arranged to support the housing upon said element, said spring means by deflection thereof providing for movement of the gyro about one axis and exerting a restoring moment urging the gyro about said axis toward a neutral position relative to said element, and second spring means for exerting an anti-restoring moment upon the gyro, said second spring means being connected at its opposite ends respectively to the element and to the housing, and having attenuated portions adjacent its ends to provide flexure points about which it may pivot, the line of action of the spring extending through said flexure points and intersecting said axis in said neutral position of the gyro and departing from said axis as the gyro moves about the latter relative to said element.

4. A mounting for a gyro comprising first spring means arranged to support the gyro for limited movement about one axis thereof and to exert a restoring moment when the gyro is displaced about said axis from a neutral position, and second spring means arranged to exert an anti-restoring moment on the gyro, said second spring means comprising a spring having its ends secured respectively to the gyro and to a supporting element, the spring having attenuated portions adjacent its ends to provide flexure points disposed substantially along the line of force of the spring, and the line of force of said second spring means substantially intersecting said axis when the gyro is in said neutral position.

5. A mounting for a gyro comprising first spring means arranged to support the gyro for limited movement about one axis thereof and to exert a restoring moment when the gyro is displaced from a neutral position, and second spring means arranged to exert an anti-restoring moment on the gyro, said second spring means comprising a tensioned spring having its ends secured respectively to the gyro and to a support element, the spring having attenuated portions adjacent its ends to provide flexure points disposed substantially along the line of force of the spring and on opposite sides of said axis from each other, and the line of force of said second spring means substantially intersecting said axis when the gyro is in said neutral position.

JOSEPH C. BOLTINGHOUSE.

REFERENCES CITED

The following references are of record in the file of this patent:

UNITED STATES PATENTS

| Number | Name | Date |
|---|---|---|
| 1,389,728 | Akimoff | Sept. 6, 1921 |
| 2,209,735 | Lanck | July 30, 1940 |
| 2,322,108 | Best | June 15, 1943 |
| 2,484,823 | Hammond, Jr. | Oct. 18, 1949 |
| 2,517,612 | Varian | Aug. 8, 1950 |